Feb. 9, 1926.  
J. BECK  
HOOK  
Filed July 17, 1925  
1,572,347

Inventor  
JOSEPH BECK  
By Geo. Stevens  
Attorney

Patented Feb. 9, 1926.

1,572,347

UNITED STATES PATENT OFFICE.

JOSEPH BECK, OF TWO HARBORS, MINNESOTA.

HOOK.

Application filed July 17, 1925. Serial No. 44,224.

*To all whom it may concern:*

Be it known that I, JOSEPH BECK, a citizen of the United States, residing at Two Harbors, in the county of Lake and State of Minnesota, have invented certain new and useful Improvements in Hooks, of which the following is a specification, reference being had therein to the accompanying drawing.

This invention relates to safety hooks and one particularly adapted for use in connection with a cablet such as used for vehicle towing or the like.

The principal object is to produce a simple and efficient safety device, for this purpose.

Another object is to produce one most readily cooperatively engaged with a rope in forming a bight thereupon.

Other objects and advantages will appear in the further description of the invention.

Referring now to the accompanying drawing, forming part of this application, and in which like reference characters indicate like parts:

The hook in its broad sense comprises a substantially cylindrically shaped hub 1 from the opposite sides of which extend two spaced arcuately shaped terminals or hooks 2 and 3, they being arched in such a manner as to form substantially a true circle inclosing the hub 1 as viewed axially of the hub.

In this manner a hook is formed intermediate of the spaced extremities of which a line may be applied or removed in respect to the central opening formed by the hooks to one side of the hub portion, and when a line or other object is placed intermediate of the hooks into said space and turned in parallel relation to the axis of the hub thereof the object cannot become dislodged from the hook, but requiring first a return to its transverse entering position before it can be removed.

Figure 1:
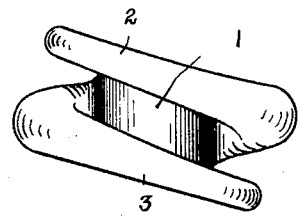
Figure 1 is a side or mouth elevation of one of the improved hooks.
Figure 2:
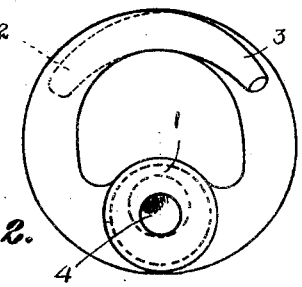
Figure 2 is an end elevation.
Figure 3:
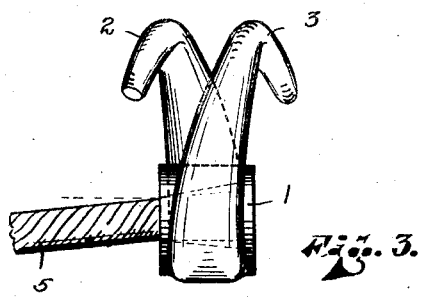
Figure 3 is a side elevation taken at right angles to Figure 1.

In the hub 1, as illustrated in Figures 2 and 3, is formed a tapered hole, as at 4, into which the end of the cablet 5 may be wedged in any desired manner, and this hole I prefer to form somewhat obliquely, as suggested in Figures 2 and 3, so that the cablet 5 naturally leads at an angle therefrom to avoid abrupt turning thereof when placed about an object of any considerable size.

Figure 4:
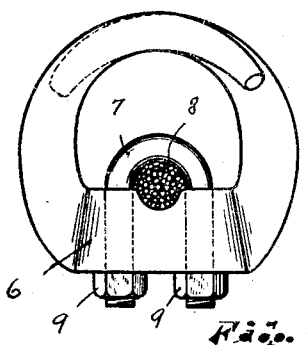
Figure 4 is a view similar to Figure 2, illustrating a modified form of attaching means for the hook.

In Figure 4 is shown a different form of hub 6 which has cooperatively engaged therewith the U-shaped bolt 7 intermediate of which and the hub 6 is clamped the cable as shown at 8, there being a suitable nut 9 upon either end of the bolt or staple 7.

Figure 5:
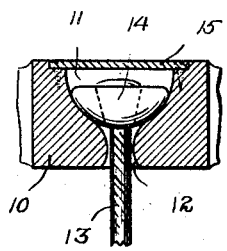
Figure 5 is an enlarged sectional view of the hub of the hook, showing a still further modified form of attaching means.

In Figure 5 the hub is shown at 10 and as having a bore therethrough considerably larger upon one side of the hub, as at 11, and reduced to approximately the size of the cable as at 12, the cable being shown at 13, and carrying the semi-spherically shaped knob 14 upon the end thereof. This knob is designed to oscillate within the enlarged portion 11 of the bore of the hub to prevent sharp turning of the cablet as it leaves the hub. The open face of the end 11 of the bore in the hub is shown as closed with a cover 15 being held in place with suitable screws so that the hook will not slip onto the cablet beyond the end thereof.

Figure 6:
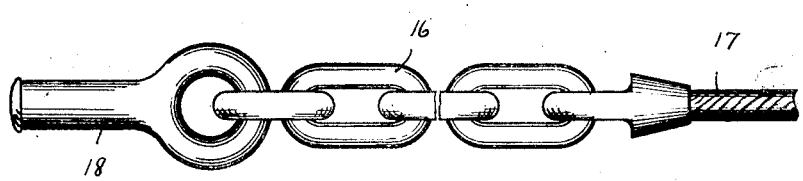
Figure 6 is a side elevation of a cablet terminal illustrating a still further modified form of attachment for cooperative engagement with the hook.

In Figure 6 is shown a modified terminal of the cablet to provide greater resiliency thereof, if desired, there being a short length of chain links, as illustrated at 16, fastened to the end of the cablet 17; these links ending with a cooperative finger 18 which may be clamped into the keeper of the hook shown in Figure 4 of the drawing. By this form of attachment it is apparent that the freedom of the hook on the end of the line would be materially increased and its ability to remain taut about an object being pulled in the event of slack in the cablet is materially augmented.

Having thus described my invention, what I claim and desire to secure by Letters Patent, is:

1. The combination with a sister hook for the terminal of a line, said hook having an elongated hub portion parallel with the axis of the hook and spaced therefrom, and means within said hub portion for permanently engaging the line.

2. A circular sister hook of the character described having the termini thereof spaced longitudinally of the axis of the body portion of the hook and a hub portion at the union of the two halves of the hook, said hub portion being of less length than the distance between the termini of the hooks.

In testimony whereof I hereunto affix my signature.

JOSEPH BECK.